US009311777B2

(12) United States Patent
Anderson et al.

(10) Patent No.: US 9,311,777 B2
(45) Date of Patent: Apr. 12, 2016

(54) SYSTEMS, METHODS AND DEVICES FOR CONFIGURING WAGERING GAME SYSTEMS AND DEVICES

(71) Applicant: WMS Gaming Inc., Waukegan, IL (US)

(72) Inventors: Peter R. Anderson, Glenview, IL (US); Srinivyasa M. Adiraju, Vernon Hills, IL (US); Vernon W. Hamlin, Lisle, IL (US); James V. Palermo, Chicago, IL (US); Craig J. Sylla, Round Lake, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 533 days.

(21) Appl. No.: 13/776,992

(22) Filed: Feb. 26, 2013

(65) Prior Publication Data

US 2014/0051500 A1 Feb. 20, 2014

Related U.S. Application Data

(60) Provisional application No. 61/684,284, filed on Aug. 17, 2012, provisional application No. 61/693,543, filed on Aug. 27, 2012.

(51) Int. Cl.

*G06F 17/00* (2006.01)
*G06F 19/00* (2011.01)
*G07F 17/32* (2006.01)

(52) U.S. Cl.

CPC ........ *G07F 17/3234* (2013.01); *G07F 17/3227* (2013.01); *G07F 17/3244* (2013.01)

(58) Field of Classification Search

CPC ......................... G07F 17/3227; G07F 17/3244
See application file for complete search history.

(56) References Cited

U.S. PATENT DOCUMENTS 4,527,798 A 7/1985 Siekierski et al. .......... 273/86 R
4,805,907 A 2/1989 Hagiwara ................. 273/138 A
4,856,787 A 8/1989 Itkis ............................. 273/237

(Continued)

FOREIGN PATENT DOCUMENTS

AU 2005251830 12/2005 .............. A63F 13/12
EP 0829834 3/1998 .............. G07F 17/32

(Continued)

OTHER PUBLICATIONS

Levinthal, A. et al. "Silicon Gaming Odyssey Slot Machine." Proceedings of COMPCON 97, 1997 (6 pages).

*Primary Examiner* — Steven J Hylinski
(74) *Attorney, Agent, or Firm* — Nixon Peabody LLP

(57) ABSTRACT

Gaming devices, gaming systems, methods of configuring gaming devices, and computer programs for configuring gaming devices are featured. A gaming system for playing a wagering game is disclosed which includes a processor(s), an input device(s), a gaming device(s), and a memory device(s) storing instructions that, when executed by at least one of the processors, cause the gaming system to: receive, via at least one of the input devices, a desired value for a player-performance variable and/or a game-configuration variable for at least one of the gaming devices; based on the desired value, output a recommended value for a configuration parameter for the gaming device(s); and, responsive to a confirmation input received via at least one of the input devices, configure the gaming device(s) in accordance with at least the recommended value for the first configuration parameter.

25 Claims, 6 Drawing Sheets

(56) References Cited

U.S. PATENT DOCUMENTS 4,858,930 A 8/1989 Sato ................................ 273/85
4,861,041 A 8/1989 Jones et al. ................... 273/292
4,964,638 A 10/1990 Ishida ....................... 273/138 A
5,042,810 A 8/1991 Williams ...................... 273/142
5,083,271 A 1/1992 Thacher et al. ............... 341/411
5,116,055 A 5/1992 Tracy ........................ 273/138 A
5,249,800 A 10/1993 Hilgendorf et al. ....... 273/138 A
5,280,909 A 1/1994 Tracy ........................ 273/138 A
5,344,144 A 9/1994 Canon ....................... 273/138 A
5,397,133 A 3/1995 Penzias ......................... 273/439
5,489,103 A 2/1996 Okamoto ...................... 273/433
5,564,700 A 10/1996 Celona ............................ 463/27
5,580,309 A 12/1996 Piechowiak et al. ............ 463/16
5,586,937 A 12/1996 Menashe ......................... 463/41
5,588,650 A 12/1996 Eman et al. ............... 273/142 B
5,611,730 A 3/1997 Weiss .............................. 463/20
5,655,961 A 8/1997 Acres et al. ..................... 463/27
5,674,128 A 10/1997 Holch et al. .................... 463/42
5,707,286 A 1/1998 Carlson ........................... 463/16
5,743,523 A 4/1998 Kelly et al. ................ 273/138.1
5,759,102 A 6/1998 Pease et al. ..................... 463/42
5,761,647 A 6/1998 Boushy ........................... 705/10
5,761,649 A 6/1998 Hill ................................. 705/27
5,762,552 A 6/1998 Vuong et al. .................... 463/25
5,770,533 A 6/1998 Franchi ........................... 463/42
5,800,268 A 9/1998 Molnick ......................... 463/40
5,816,918 A 10/1998 Kelly et al. ..................... 463/16
5,823,879 A 10/1998 Goldberg et al. ............... 463/42
5,830,069 A 11/1998 Soltesz et al. ................... 463/45
5,851,149 A 12/1998 Xidos et al. ..................... 463/42
5,876,284 A 3/1999 Acres et al. ..................... 463/25
5,885,158 A 3/1999 Torango et al. ................. 463/27
5,941,773 A 8/1999 Harlick ........................... 463/26
5,971,271 A 10/1999 Wynn et al. ................... 235/380
5,971,849 A 10/1999 Falciglia ......................... 463/16
5,999,808 A 12/1999 LaDue .......................... 455/412
6,001,016 A 12/1999 Walker et al. ................... 463/42
6,003,013 A 12/1999 Boushy et al. .................. 705/10
6,012,982 A 1/2000 Piechowiak et al. ............ 463/16
6,012,983 A 1/2000 Walker et al. ................... 463/20
6,012,984 A 1/2000 Roseman ........................ 463/42
6,026,433 A 2/2000 D'Arlach et al. ............. 709/217
6,068,552 A * 5/2000 Walker ................ G07F 17/3244
273/139
6,077,162 A 6/2000 Weiss .............................. 463/26
6,080,062 A 6/2000 Olson ............................. 463/42
6,089,975 A 7/2000 Dunn .............................. 463/16
6,089,980 A 7/2000 Gauselmann ................... 463/27
6,104,815 A 8/2000 Alcorn et al. ................. 380/251
6,110,041 A 8/2000 Walker et al. ................... 463/20
6,110,043 A 8/2000 Olsen .............................. 463/27
6,113,495 A 9/2000 Walker et al. ................... 463/42
6,117,011 A 9/2000 Lvov .............................. 463/25
6,135,884 A 10/2000 Hedrick et al. ................. 463/20
6,135,887 A 10/2000 Pease et al. ..................... 463/42
6,146,273 A 11/2000 Olsen ............................. 463/27
6,149,522 A 11/2000 Alcorn et al. ................... 463/29
6,183,362 B1 2/2001 Boushy ........................... 463/25
6,183,366 B1 2/2001 Goldberg et al. ............... 463/42
6,196,920 B1 3/2001 Spaur et al. ..................... 463/42
6,204,560 B1 3/2001 Daetwyler et al. ............ 257/745
6,210,274 B1 4/2001 Carlson ........................... 463/16
6,241,608 B1 6/2001 Torango .......................... 463/27
6,264,557 B1 7/2001 Schneier et al. ................ 463/29
6,264,561 B1 7/2001 Saffari et al. ................... 463/42
6,272,223 B1 8/2001 Carlson ......................... 380/251
6,273,821 B1 8/2001 Moriguchi ...................... 463/42
6,286,003 B1 9/2001 Muta ............................... 707/10
6,287,200 B1 9/2001 Sharma ........................... 463/40
6,334,104 B1 12/2001 Hirai ............................ 704/258
6,346,048 B1 2/2002 Ogawa et al. ................... 463/42
6,354,946 B1 3/2002 Finn ................................ 463/40
6,361,437 B1 3/2002 Walker et al. ................... 463/23
6,402,618 B1 6/2002 Reed et al. ...................... 463/40
6,406,371 B1 6/2002 Baba et al. ...................... 463/42
6,409,602 B1 6/2002 Wiltshire et al. ............... 463/42
6,428,413 B1 8/2002 Carlson ........................... 463/16
6,434,398 B1 8/2002 Inselberg ...................... 455/517
6,454,650 B1 9/2002 Aronin ............................ 463/17
RE37,885 E 10/2002 Acres et al. ..................... 463/42
6,488,580 B1 12/2002 Robb ............................. 463/23
6,508,709 B1 1/2003 Karmarkar ...................... 463/42
6,508,710 B1 1/2003 Paravia et al. .................. 463/42
6,517,433 B2 2/2003 Loose et al. .................... 463/20
6,554,710 B1 4/2003 Olson ............................. 463/42
6,560,639 B1 5/2003 Dan et al. ...................... 709/218
6,592,460 B2 7/2003 Torango .......................... 463/27
6,645,077 B2 11/2003 Rowe ............................. 463/42
6,652,378 B2 11/2003 Cannon et al. .................. 463/20
6,749,510 B2 6/2004 Giobbi ............................ 463/42
6,805,634 B1 10/2004 Wells et al. .................... 463/42
6,843,725 B2 1/2005 Nelson ............................ 463/40
6,860,810 B2 3/2005 Cannon et al. .................. 463/20
6,884,173 B2 4/2005 Gauselmann ................... 463/42
RE38,812 E 10/2005 Acres et al. ..................... 463/26
6,955,604 B1 10/2005 Graves et al. ................... 463/42
6,986,055 B2 1/2006 Carlson ......................... 713/200
7,056,215 B1 6/2006 Olive .............................. 463/27
7,083,520 B2 8/2006 Rowe .............................. 463/42
7,108,603 B2 9/2006 Olive .............................. 463/27
7,144,321 B2 12/2006 Mayeroff ........................ 463/16
7,260,834 B1 8/2007 Carlson ............................. 726/4
7,285,049 B1 10/2007 Luciano, Jr. et al. ........... 463/42
7,311,601 B2 12/2007 Anderson et al. ............... 463/20
7,316,619 B2 1/2008 Nelson ............................ 463/42
7,470,196 B1 12/2008 Joshi ............................... 463/42
7,476,153 B2 1/2009 Walker et al. ................... 463/20
7,641,555 B2 1/2010 McKinley et al. .............. 463/43
7,722,466 B2 5/2010 Rothschild ...................... 463/42
7,896,741 B2 3/2011 Kuehling et al. ............... 463/29
7,934,993 B2 5/2011 Kuehling et al. ............... 463/29
8,016,663 B2 * 9/2011 Soltys ....................... A63F 1/18
463/13
8,029,360 B2 10/2011 Lind et al. ....................... 463/29
8,029,365 B2 10/2011 Burke et al. .................... 463/42
8,083,585 B2 12/2011 Brosnan .......................... 463/29
8,142,291 B2 3/2012 Ryan ............................... 463/43
8,323,101 B2 12/2012 Anderson et al. ............... 463/27
2001/0044337 A1 11/2001 Rowe et al. ..................... 463/29
2001/0044339 A1 11/2001 Cordero et al. ................. 463/42
2002/0002073 A1 * 1/2002 Montgomery ...... G07F 17/3262
463/13
2002/0032049 A1 3/2002 Walker et al. ................... 463/16
2002/0034977 A1 * 3/2002 Burns ....................... G07F 7/04
463/25
2002/0037767 A1 3/2002 Ebin ............................... 463/25
2002/0045484 A1 4/2002 Eck et al. ........................ 463/42
2002/0068631 A1 6/2002 Raverdy et al. ................. 463/42
2002/0071557 A1 6/2002 Nguyen ........................ 380/251
2002/0073043 A1 6/2002 Herman et al. ................. 705/64
2002/0087876 A1 7/2002 Larose ......................... 713/200
2002/0094869 A1 7/2002 Harkham ........................ 463/42
2002/0107072 A1 8/2002 Giobbi ............................ 463/42
2002/0116615 A1 8/2002 Nguyen et al. ................ 713/168
2002/0137217 A1 9/2002 Rowe .............................. 436/42
2002/0138594 A1 9/2002 Rowe ........................... 709/219
2002/0142825 A1 * 10/2002 Lark .................... G06Q 20/382
463/16
2002/0142841 A1 10/2002 Boushy ........................... 463/42
2002/0142846 A1 10/2002 Paulsen ........................... 463/43
2002/0147047 A1 10/2002 Letovsky et al. ............... 463/42
2002/0151366 A1 * 10/2002 Walker .................. G07F 17/323
463/42
2003/0028567 A1 2/2003 Carlson ......................... 708/250
2003/0064771 A1 4/2003 Morrow et al. ................. 463/16
2003/0083943 A1 5/2003 Adams et al. ................... 705/14
2003/0162589 A1 8/2003 Nguyen et al. .................. 463/25
2003/0190959 A1 10/2003 Olson ............................. 463/42
2003/0195043 A1 10/2003 Shinners et al. ................ 463/42
2003/0216182 A1 11/2003 Gauselmann ................... 463/40
2004/0158536 A1 8/2004 Kowal et al. .................. 705/400
2004/0166940 A1 * 8/2004 Rothschild .......... G07F 17/3234
463/42
2004/0209660 A1 10/2004 Carlson et al. .................... 463/1

(56) References Cited

U.S. PATENT DOCUMENTS

| | | | | |
|---|---|---|---|---|
| 2005/0054419 | A1 | 3/2005 | Souza et al. | 463/20 |
| 2005/0070353 | A1* | 3/2005 | Webb | G07F 17/32<br>463/16 |
| 2005/0193209 | A1 | 9/2005 | Saunders et al. | 713/182 |
| 2006/0073887 | A1 | 4/2006 | Nguyen et al. | 463/27 |
| 2006/0073888 | A1 | 4/2006 | Nguyen et al. | 463/27 |
| 2006/0142079 | A1 | 6/2006 | Ikehara et al. | 463/27 |
| 2006/0165235 | A1 | 7/2006 | Carlson | 380/268 |
| 2006/0264256 | A1 | 11/2006 | Gagner et al. | 463/20 |
| 2006/0287098 | A1 | 12/2006 | Morrow et al. | 463/42 |
| 2007/0060314 | A1 | 3/2007 | Baerlocher et al. | 463/25 |
| 2007/0060321 | A1 | 3/2007 | Vasquez et al. | 463/27 |
| 2007/0077990 | A1 | 4/2007 | Cuddy et al. | 463/25 |
| 2007/0191088 | A1 | 8/2007 | Breckner et al. | 463/20 |
| 2007/0232392 | A1 | 10/2007 | Pace | 463/29 |
| 2007/0259709 | A1 | 11/2007 | Kelly et al. | 463/20 |
| 2007/0293293 | A1 | 12/2007 | Baerlocher et al. | 463/16 |
| 2007/0298857 | A1 | 12/2007 | Schlottmann et al. | 463/16 |
| 2007/0298874 | A1 | 12/2007 | Baerlocher et al. | 463/27 |
| 2007/0298875 | A1 | 12/2007 | Baerlocher et al. | 463/27 |
| 2008/0020830 | A1 | 1/2008 | Ikehara et al. | 463/27 |
| 2008/0020831 | A1 | 1/2008 | Ikehara et al. | 463/27 |
| 2008/0020832 | A1 | 1/2008 | Iddings et al. | 463/27 |
| 2008/0020833 | A1 | 1/2008 | Baerlocher et al. | 463/27 |
| 2008/0020834 | A1 | 1/2008 | Breckner et al. | 463/27 |
| 2008/0020846 | A1 | 1/2008 | Vasquez et al. | 463/42 |
| 2008/0039189 | A1* | 2/2008 | Walker | G06Q 30/06<br>463/25 |
| 2008/0045344 | A1 | 2/2008 | Schlottmann et al. | 463/42 |
| 2008/0064501 | A1 | 3/2008 | Patel | 463/40 |
| 2008/0064502 | A1 | 3/2008 | Schlottmann et al. | 463/42 |
| 2008/0070680 | A1 | 3/2008 | Baerlocher et al. | 463/27 |
| 2008/0070692 | A1 | 3/2008 | Schlottmann et al. | 463/42 |
| 2008/0070693 | A1 | 3/2008 | Schlottmann et al. | 463/42 |
| 2008/0070694 | A1 | 3/2008 | Schlottmann et al. | 463/42 |
| 2008/0070695 | A1 | 3/2008 | Baerlocher et al. | 463/42 |
| 2008/0070702 | A1 | 3/2008 | Kaminkow et al. | 463/46 |
| 2008/0076514 | A1 | 3/2008 | Baerlocher et al. | 463/20 |
| 2008/0076515 | A1 | 3/2008 | Baerlocher et al. | 463/20 |
| 2008/0076517 | A1 | 3/2008 | Baerlocher et al. | 463/20 |
| 2008/0076547 | A1 | 3/2008 | Bigelow et al. | 463/29 |
| 2008/0076552 | A1 | 3/2008 | Baerlocher et al. | 463/31 |
| 2008/0146344 | A1 | 6/2008 | Rowe et al. | 463/42 |
| 2008/0153588 | A1 | 6/2008 | Muir et al. | 463/29 |
| 2009/0054139 | A1* | 2/2009 | Anderson | G07F 17/32<br>463/31 |
| 2009/0082082 | A1* | 3/2009 | Carr-Gregg | G07F 17/32<br>463/20 |
| 2009/0325686 | A1 | 12/2009 | Davis et al. | 463/25 |
| 2010/0004047 | A1* | 1/2010 | Acres | G07F 17/3244<br>463/20 |
| 2010/0062196 | A1 | 3/2010 | Bezek et al. | 428/35.2 |
| 2010/0069160 | A1 | 3/2010 | Barrett et al. | 463/46 |
| 2010/0106823 | A1 | 4/2010 | Davis et al. | 709/224 |
| 2010/0234097 | A1* | 9/2010 | Gelber | G07F 17/32<br>463/25 |
| 2010/0234099 | A1 | 9/2010 | Rasmussen et al. | 463/29 |
| 2010/0298040 | A1 | 11/2010 | Joshi et al. | 463/16 |
| 2012/0046110 | A1 | 2/2012 | Amaitis et al. | 463/42 |
| 2012/0058814 | A1 | 3/2012 | Lutnick et al. | 463/25 |
| 2012/0172123 | A1 | 7/2012 | Beaulieu et al. | 463/31 |

FOREIGN PATENT DOCUMENTS

| | | | |
|---|---|---|---|
| EP | 0843272 | 5/1998 | G07F 17/32 |
| EP | 1231577 | 8/2002 | G07F 17/32 |
| EP | 1363252 | 11/2003 | G07F 17/32 |
| EP | 1463008 | 9/2004 | A63F 13/12 |
| EP | 1469436 | 10/2004 | A63F 9/24 |
| WO | 96/11730 | 4/1996 | A63F 13/12 |
| WO | 97/12338 | 4/1997 | A63F 9/22 |
| WO | 97/27568 | 7/1997 | G07F 17/34 |
| WO | 98/35309 | 8/1998 | G06F 19/00 |
| WO | 01/91866 | 12/2001 | G07F 17/32 |
| WO | 02/32526 | 4/2002 | A63F 13/12 |
| WO | 2004/034223 | 4/2004 | G07F 17/32 |
| WO | 2005/120672 | 12/2005 | A63F 13/12 |
| WO | 2006/076185 | 7/2006 | A63F 13/00 |
| WO | 2007/089410 | 9/2007 | A63F 9/24 |
| WO | 2007/139988 | 12/2007 | G06F 19/00 |
| WO | 2008/030904 | 3/2008 | A63F 9/24 |
| WO | 2008/060426 | 5/2008 | A63F 1/00 |
| WO | 2008/060442 | 5/2008 | A63F 13/10 |
| WO | 2008/060459 | 5/2008 | A63F 13/10 |
| WO | 2008/060513 | 5/2008 | A63F 13/10 |
| WO | 2008/063408 | 5/2008 | A63F 13/10 |

* cited by examiner

SYSTEMS, METHODS AND DEVICES FOR CONFIGURING WAGERING GAME SYSTEMS AND DEVICES

CLAIM OF PRIORITY AND CROSS-REFERENCE TO RELATED APPLICATIONS

This application claims the benefit of and priority to U.S. Provisional Patent Application No. 61/684,284, which was filed on Aug. 17, 2012, and U.S. Provisional Patent Application No. 61/693,543, which was filed on Aug. 27, 2012, both of which are incorporated herein by reference in their respective entireties.

COPYRIGHT

A portion of the disclosure of this patent document contains material which is subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game terminals and wagering game systems. More particularly, the present disclosure relates to systems, methods, and devices for configuring wagering game machines, wagering game terminals, gaming systems, portable gaming devices, and the like.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously strive to develop new games and improved gaming enhancements that will attract frequent play through enhanced entertainment value to the player.

There are three main types of wagering game machines: mechanical, electromechanical, and electronic. The original slot machine, for example, was entirely mechanical in construction, working on an elaborate configuration of springs, gears, shafts, brakes and levers. Since its introduction in the early 1960's, the electromechanical gaming machine began replacing most, if not all, mechanical slot machines. Electromechanical gaming machines typically use one or more microprocessors to determine a random outcome, and electrical stepper motors to spin and stop a set of mechanical reels. The electronic gaming machine (EGM), in comparison, subsequently supplanted the mechanical reels of the electromechanical gaming machine with simulated mechanical reels generated by a video display device. In addition to slot-type wagering games, traditional table games, such as poker, blackjack, keno, and bingo, were adapted for use on EGM's.

The use of microprocessors has significantly advanced the state of the art of electronic gaming. For instance, microprocessors offer gaming machines much greater latitude in determining random game outcomes. Random game outcomes are typically determined by a random number generator (RNG) that is driven by a central processing unit (CPU). A probability table contains all possible game outcomes, with each game outcome being linked to a distinct number. Once generated, the random number is used to look up the corresponding game outcome in the probability table. The CPU then signals the stepper motors to drive and position the reels to coincide with the randomly determined game outcome. Microprocessor-driven EGM's allow gaming manufacturers to design slot games with more flexible pay tables. In a specific example, microprocessor-driven gaming machines can offer high value, low probability awards while contemporaneously offering low value, high probability awards—offering a range of awards that an all-mechanical slot machine cannot.

The increased power of modern microprocessors has enabled the introduction of new gaming machine capabilities that allow the addition of entirely new classes of features and functions. Many EGM designs allow these features and functions to be enabled in a variety of different combinations to operate on a wide variety of different technological platforms. Enabling these features oftentimes requires they be configured to casino specifications, without departing from state gaming regulations, when the EGM's are first set up on the casino floor. These configuration parameters can enable the gaming machine to network with the casino's existing central computer systems, for example, to coordinate with the casino's cashless gaming systems, wagering processes, accounting procedures, player-tracking data collection, etc.

Networking a gaming machine to a gaming establishment's central computer system typically requires the machine be configured to establish communication, including selection of communication protocols for communication between the gaming machine and host system. This may include selection of the host ports for electronic funds transfers, establishing gaming machine communication addresses, host communication protocol bonus control, etc. As part of the initial set up process, a number of configuration parameters may also be set to customize the gaming machine, for example, to comport with the wagering processes used by a particular gaming establishment. These specifications can include the selection of payout devices (e.g., hopper, ticket printer, cashless player account, etc.), selection of payout options (e.g., split pays from both the hopper and ticket printer), and controlling ticket printer parameters. The gaming machine may also be configured to customize the presentation of the game. These configuration parameters can include, in some non-limiting examples: screen brightness, gaming machine lighting, speaker volume, presentation of multiple games, payback percentages, etc. Some additional miscellaneous configuration categories include: ticket-in control configuration, validation control, and gaming machine operating modes (including demonstration and diagnostic mode). Within each of these categories can be a number of different selections, and even sub-selections.

The number and complexity of configuration parameters can require considerable technician time during the initial EGM set up process. Historically, the configuration process required selecting and implementing operating parameters for each gaming machine—the gaming machine was manually configured through an extensive set of administrative menus. Some parameters require multiple menus and value entries to be completely configured. For some electronic gaming machines, the video display has a touch screen that can be used as an input device to configure the gaming machine. The technician is provided with instructions and options displayed on the video display for each configuration parameter, and the technician selects configuration parameters using the touch screen. This can become a time-consuming, tedious, and, in some instances, error-prone process, especially when numerous gaming machines must be configured.

Overcoming the problems associated with configuring hundreds, if not thousands, of gaming machines, whether they are electromechanical or electronic gaming machines, is an expensive, time-consuming process. This issue can be exacerbated when new gaming features and functions are introduced to the market, or certain gaming machines are underperforming when compared to their counterparts, and operators wish to configure/reconfigure multiple gaming machines that are out on the casino floor. What is needed are new methods and devices for configuring wagering game machines to increase the accuracy and efficiency of the configuration process.

SUMMARY

Aspects of the present disclosure are directed to systems, methods and devices for configuring wagering game systems and devices. An administrative configuration system is disclosed which, based upon one or more inputs from the operator or technician, recommends configuration parameters to optimize machine performance for the given input(s). To achieve "optimal math setup," the EGM can recommend values for one or more of the following configuration parameters: game denomination ("denom"), payline count, minimum bet, maximum bet, and hold percentage. In some configurations, the operator is provided with an "advanced setup" feature which provides the ability to manually adjust one or more of the recommended configuration parameter values. Some embodiments may offer "general wizard" like functionality which walks the operator or technician through each step of configuration process, rather than requiring the operator/technician to traverse through various menus.

Also disclosed is an optional unified interface configuration module between the administration, operation and maintenance (AOM) server(s), Mirador server(s), real-time gaming (RTG) server(s), and the EGM. An abstracted cross-platform "EGM configuration application" can be built and called up by different systems during configuration. Any system could then set the configuration parameters and transmit them to a standard application programming interface (API). An advantage of this system is that updates, improvements, and/or changes can more easily propagate from one system to another, rather than having separate configuration implementations for each system. This approach can also offer more cross-system consistency.

According to one aspect of the present disclosure, a gaming system for playing a wagering game is disclosed. The gaming system includes one or more processors, one or more gaming devices, and one or more memory devices. The memory device(s) stores instructions that, when executed by at least one of the one or more processors, cause the gaming system to: receive, via at least one of one or more input devices, a desired value for at least one of a player-performance variable or a game-configuration variable for at least one of the one or more gaming devices; based on the desired value, output a recommended value for a first configuration parameter for the at least one of the one or more gaming devices; and responsive to a confirmation input received via at least one of the one or more input devices, configure the at least one gaming device in accordance with at least the recommended value for the first configuration parameter.

Other aspects of the present disclosure are directed to a computer-implemented method of configuring one or more gaming devices in a gaming system. The method includes: receiving, via at least one of one or more input devices, a desired value for at least one of a player-performance variable or a game-configuration variable for at least one of the one or more gaming devices; based on the desired value, outputting a recommended value for a first configuration parameter for the at least one of the one or more gaming devices; and responsive to a confirmation input received via at least one of the one or more input devices, configuring the at least one gaming device in accordance with at least the recommended value for the first configuration parameter.

In accordance with another aspect of the disclosure, one or more physical machine-readable storage media are featured which include instructions which, when executed by one or more processors, cause the one or more processors to perform operations to complete any of the disclosed methods. These operations may comprise: receive a desired value for at least one of a predetermined player-performance variable or a predetermined game-configuration variable for one or more gaming devices; based on the desired value, output a recommended value for a first configuration parameter of the one or more gaming devices; receive a confirmation input or a rejection input for the recommended value for the first configuration parameter; and responsive to receipt of the confirmation input, configure at least one of the one or more gaming devices in accordance with at least the recommended value for the first configuration parameter.

Another aspect of this disclosure is directed to a gaming terminal for conducting a wagering game. The gaming terminal includes at least one display device configured to display randomly determined outcomes of the wagering game, and at least one input device configured to receive inputs from a person. The gaming terminal also includes at least one processor, and at least one memory device. The memory device(s) stores instructions that, when executed by the processor(s), causes the gaming terminal to: receive from an operator, via the at least one input device, a respective desired value for each of a player-performance variable and a game-configuration variable for the gaming terminal, wherein the player-performance variable relates to a statistical analysis of player wagering behavior and the game-configuration variable affects a payback percentage of the wagering game; based on these desired values, determine and display a respective recommended value for each of a plurality of configuration parameters of the gaming terminal, each of the configuration parameters affecting the mathematical configuration of the wagering game; display, via the display device(s), operator-selectable options to confirm, reject, or modify the recommended values; and, responsive to receipt of a confirmation selection via the input device(s), configure the gaming terminal in accordance with at least the recommended values for the configuration parameters.

In accordance with yet another aspect, a computer-implemented method of configuring a gaming device in a wagering game system is featured. The gaming system includes a plurality of gaming devices, one or more processors, and one or more input devices. The method includes: receiving, via at least one of the one or more input devices, a desired value for an average (or "expected") wager per play for the plurality of gaming devices; determine, based at least upon the desired value, a recommended value for one or more configuration parameters for the gaming device; and configure the gaming device in accordance with at least the recommended value for the one or more configuration parameters. The average may include, for example, the arithmetic mean, median, mode, or a combination thereof.

Yet another aspect of this disclosure presents a computer-implemented method of configuring a gaming device in a wagering game system. The gaming system includes a plurality of gaming devices, one or more processors, and one or more input devices. The method includes: receiving, via at least one of the one or more input devices, a desired value for an average (or "expected") wager per play for the plurality of gaming devices; determine, based at least upon the desired value, a wager range available to a player during play of a wagering game on the gaming device, the available wagering range being configured to prevent the player from wagering at the highest or lowest value of the available wagering range; and, configure the gaming device in accordance with the available wager range.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
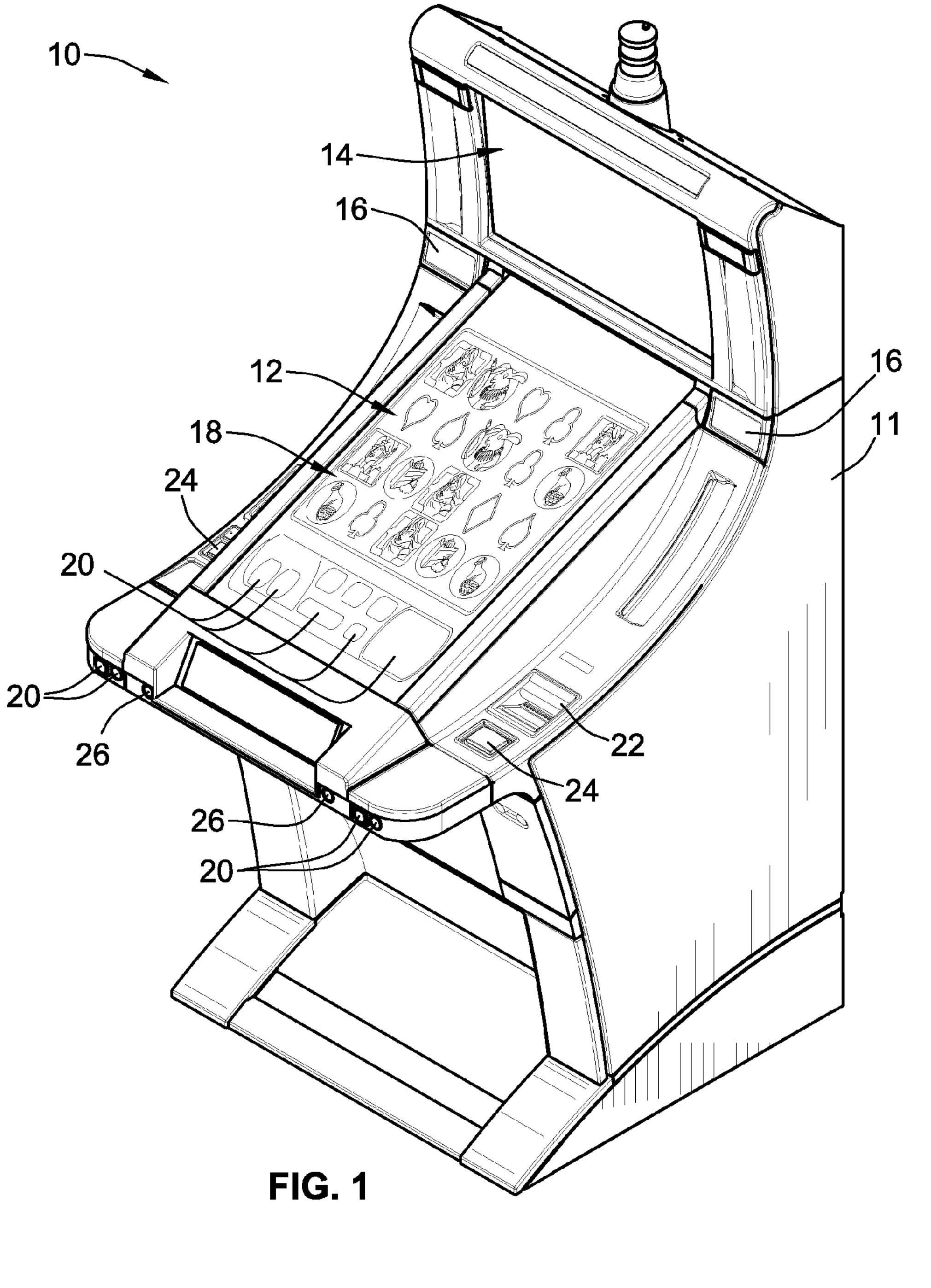
FIG. 1 is a perspective-view illustration of an exemplary free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 (used herein interchangeably with "gaming machine" and "gaming device") may be any type of wagering game device and may have varying structures and methods of operation. For example, in some aspects, the gaming terminal 10 is an electromechanical gaming terminal configured to play slots with mechanical reels, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models (as shown), handheld mobile devices, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Publication Nos. 2010/0062196 and 2010/0234099, and International Application No. PCT/US2007/000792, all of which are incorporated herein by reference in their respective entireties for all purposes.

The gaming terminal 10 illustrated in FIG. 1 comprises a cabinet 11 that may house various input devices, output devices, and input/output devices. By way of non-limiting example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display may be disposed in front of the mechanical-reel display to portray a video image superimposed upon the mechanical-reel display. The display areas may variously display information associated with wagering games, non-wagering games, community games, progressive games, advertisements, services, premium entertainment, text messaging, emails, alerts, announcements, broadcast information, subscription information, etc., appropriate to the particular mode(s) of operation of the gaming terminal 10. The gaming terminal 10 includes a touch screen(s) 18 mounted over the primary and/or secondary areas 12, 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals can be selected from a group consisting essentially of an electrical current, an electrical voltage, an electrical charge, an optical signal, an optical element, a magnetic signal, and a magnetic element.

Figure 2:
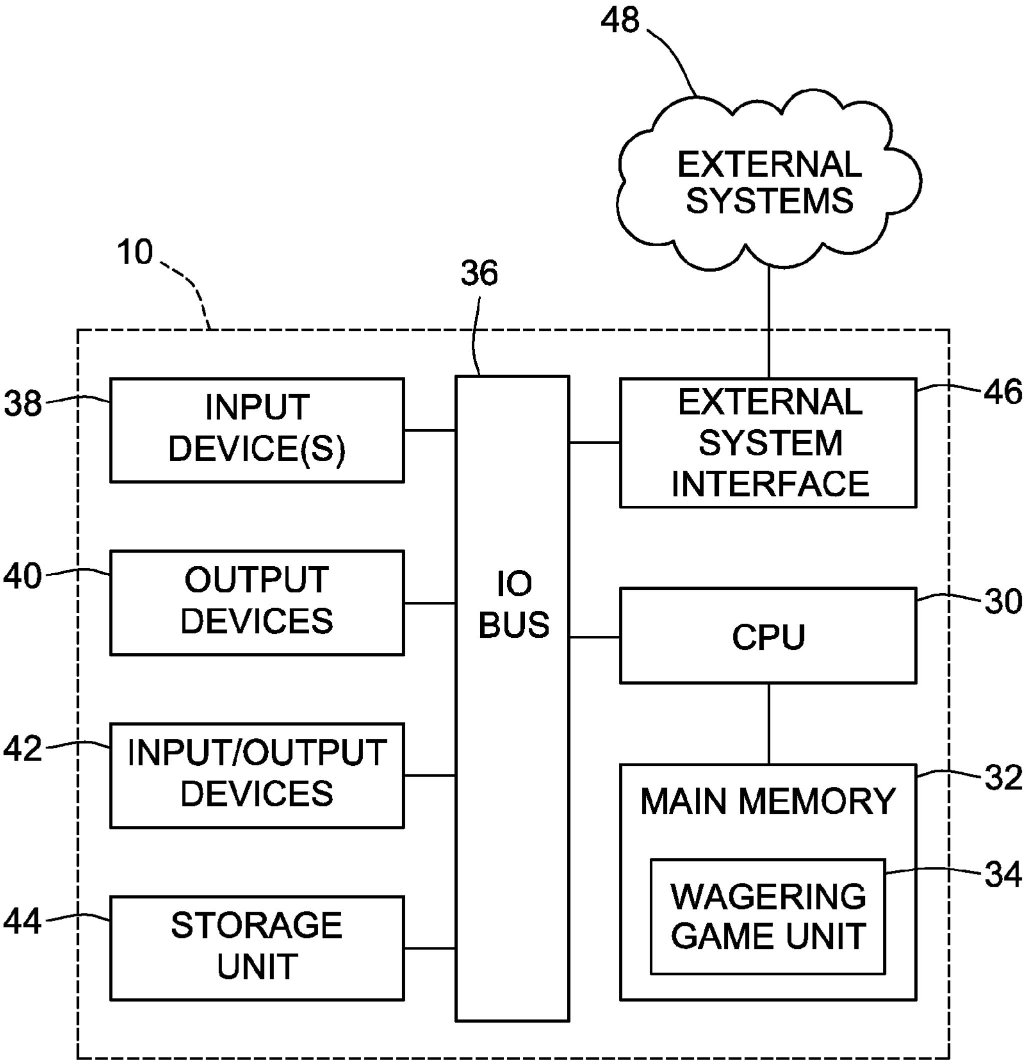
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks). In some embodiments, storage unit 44 stores performance data and/or configuration data.

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes a random number generator (RNG) for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
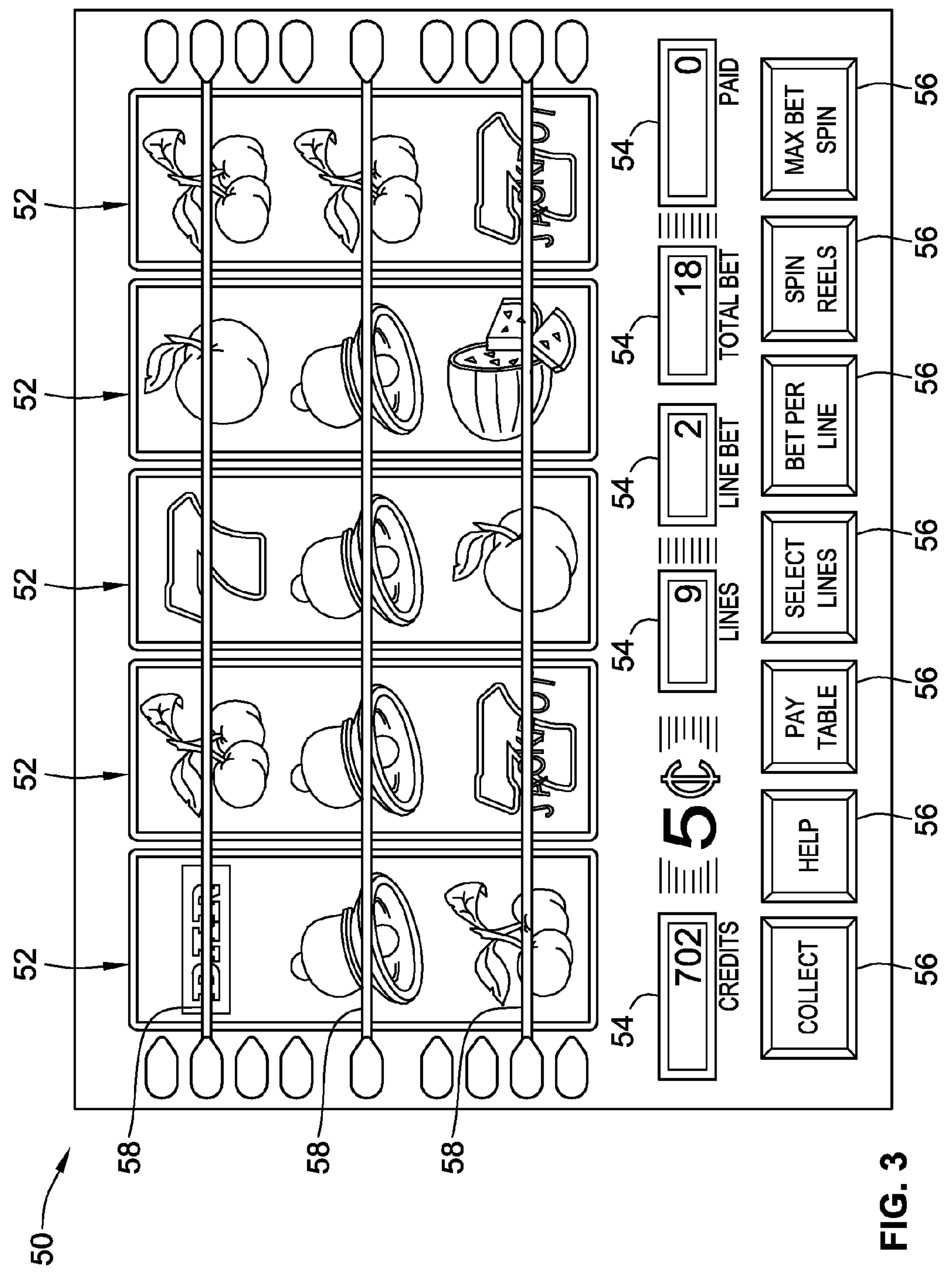
FIG. 3 is a screen shot of a representative basic-game screen of a wagering game displayed on a gaming terminal, gaming device, and/or gaming system according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by an RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4A:
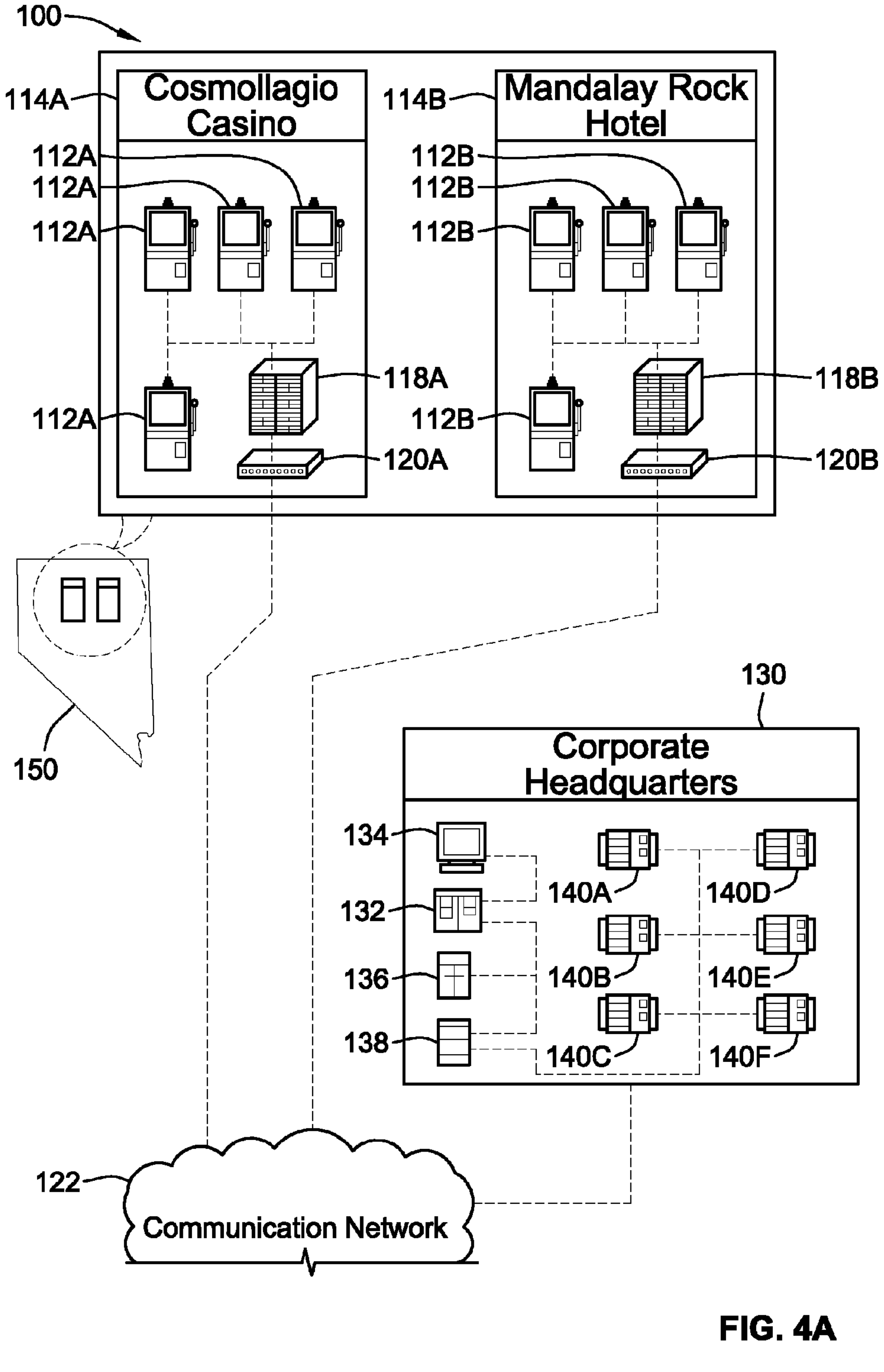
FIGS. 4A and 4B present a diagrammatic illustration of a representative gaming system and network in accordance with aspects of the present disclosure.
Figure 4B:
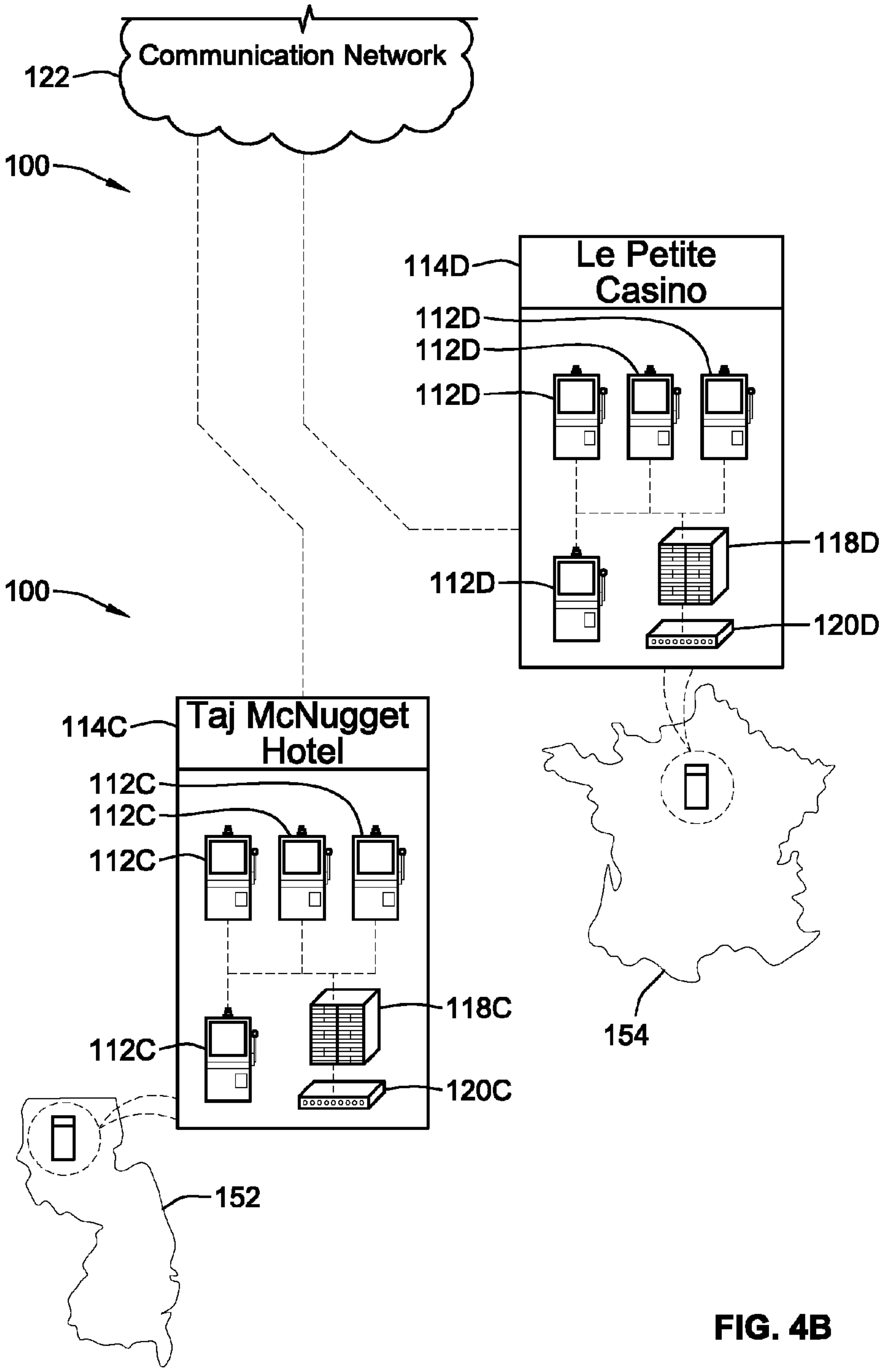

FIGS. 4A and 4B provide a diagrammatic illustration of a representative gaming system and network with which aspects of the disclosed concepts can be practiced. As shown, the gaming system and network 100 includes a first plurality of gaming terminals 112A located in a first "land-based" gaming establishment 114A (e.g., the "Cosmollagio Casino"), and a second plurality of gaming terminals 112B located in a second "land-based" gaming establishment 114B (e.g., the "Mandalay Rock Hotel"). In this regard, the gaming system and network 100 may also include a third plurality of gaming terminals 112C located in a third "land-based" gaming establishment 114C (e.g., the "Taj McNugget Hotel"), and a fourth plurality of gaming terminals 112D located in a fourth "land-based" gaming establishment 114D (e.g., the "Le Petite Casino"). According to the illustrated example, the first and second gaming establishments 114A, 114B are located in a first location 150 (e.g., the State of Nevada), whereas the third gaming establishment 114C is located in a second location 152 (e.g., the State of New Jersey), while the fourth gaming establishment 114D is located in a third location 154 (e.g., the Country of France). Each gaming establishment 114A-D utilizes a local "casino" server 118A, 118B, 118C and 118D, respectively, which is communicatively coupled to a corresponding communications hub 120A, 120B, 120C and 120D, respectively. The local servers 118A-D individually, collectively and/or in collaboration with an offsite central server system (not shown), can offer a plurality of wagering games in such categories as slots, poker, bingo, keno, and blackjack, just to name a few examples.

Although differing in appearance, the gaming terminals 112A-D can be similar in function and connectivity to the gaming terminal 10 discussed above with respect to FIGS. 1 and 2. The gaming terminals 112A-D of FIGS. 4A and 4B can take on various other configurations, including free-standing gaming terminals, handheld mobile gaming devices, countertop gaming machines, personal computers or laptop computers, mobile computing devices, or any combination thereof. In this regard, the gaming establishments may be traditional gaming establishments, such as casinos and hotels, as well as non-traditional gaming establishments, such as pools, restaurants, cruise ships, and airports.

The gaming establishments 114A-D, including one or more of the gaming terminals 112A-D, are shown communicatively linked by a communications network 122. To facilitate such communications, the communications network 122 may include wireless communication links and/or wired communication links. The wired and wireless communication links can employ any suitable connection technology, such as Bluetooth, 802.11, Ethernet, public switched telephone networks, and SONET, as some non-limiting examples. In so doing, the servers 118A-D can exchange data and serve wagering games to devices located in other casinos or at other locations on the communications network 122. Similarly, the gaming system and network 100 can send and receive performance data and configuration data to devices located in other casinos or at other locations on the communications network 122.

The communications network 122 may be an intranet network based on TCP/IP (Transmission Control Protocol/Internet Protocol) protocols belonging to an organization, usually a corporation, accessible only by the organization's members, employees, and/or others with proper authorization. In the illustrated system, the intranet can be used to securely network the gaming terminals 112A-D to a local casino server 118A-D and other terminals, both inside and outside of their respective establishments 114A-D. Each of the local servers 118A-D can operate an intranet web site and post wagering games on a web site. The web site can include a firewall to fend off unauthorized access. With proper authorization, non-casino-based personal computing devices, such as personal computers and smartphones, may access the web page(s) via the internet and thereby link to the local casino servers 118A-D and even the gaming terminals 112A-D. The communications network 122 can also be used for the individual gaming terminals 112A-D to transmit data and gaming features to each other.

When a wagering game is conducted via one of the gaming terminal 112A-D, the wagering game may be conducted at a server level, a terminal level, or a hybrid server/terminal level depending, for example, upon how the machine and the system are set up. When the wagering game is conducted at the server level, the game's audiovisual content and game software are executed, for example, at one of the local casino servers 118A-D. In this case, the gaming terminals 112A-D need not include a game engine for executing the game software and primarily serve as a display device. To allow the terminals 112A-D to execute the audiovisual content and game software, this information is downloaded from a local casino server 118A-D to the terminal 112A-D and stored locally prior for conducting the wagering game. When the wagering game is conducted at the hybrid level, the audiovisual content is executed at the terminal 112A-D while the game software is executed at the server 118A-D. To allow the terminal 112A-D to execute the audiovisual content, the audiovisual content is downloaded from the server 118A-118D and stored locally on the gaming device prior to conducting the wagering game. In order to make wagering games conducted via remote computing devices verifiable, it may be required that the random event be generated at the server 118A-D. Thus, in some embodiments, wagering games may not be conducted solely at the device level.

The gaming terminals 112A-D in each land-based gaming establishment 114A-D can be linked by a high-speed local area network, such as a wireless or wired Ethernet. Each local area network can be configured to support standard Internet protocols, such as TCP/IP, for transmitting data over the local area network and transmitting data between the local area network and a local system 118A-D. The local casino server 118A-D may include a gateway that serves as an entrance to the local area network. The gateway can be associated with a router, which knows where to direct a given packet of data that arrives at the gateway, and a switch, which furnishes the actual path in and out of the gateway for a given packet. The communications hub 120A-D can consolidate data transferred to and from the gaming terminals 112A-D. A workstation (not shown) may be used to program, control, and monitor the gaming terminals 112A-D at the local casino level.

In some embodiments, the gaming terminals 112A-D can also be networked to a corporate headquarters 130 by the communications network 122. The representative corporate headquarters 130 of FIG. 4A includes one or more corporate casino computers 134, one or more corporate casino servers 132, one or more trend analysis computers 136, one or more database managers 138, and various databases 140A-F. The corporate casino computer(s) 134 may be used to program, control, and/or monitor the gaming terminals 112A-D at the corporate level and view data accumulated in the various databases 140A-F. The corporate server(s) 132 is linked to the communications network 122 for transferring data to and from the network 122.

In some embodiments, the database manager 138 can manage data acquired by the corporate server 132 and can route the acquired data for storage in the appropriate databases 140A-F. The game library database 140A stores a plurality of wagering games. The corporate casino computer 134 may cause the database manager 138 to selectively access the wagering games in the game library database 140A and download the selected games to one or more local casino servers, gaming devices and/or a casino web server lob. The local casino servers may, in turn, download a portion or all of each selected game to some or all of the gaming terminals 112A-D in their respective casinos. The wagering games selected for download and the locations to where the games are downloaded may be based on trends established by running alternate regressions in the trend analysis computer 136. The financial accounting database 140B stores general financial accounting information.

The player account database 140C includes records or "house accounts," each of which has fields of information related to an individual player. The fields within each account may, for example, include name, date of birth, social security number, address, telephone number(s), credit card type, number and expiration date, and other requisite information. Additional optional fields may include player tracking information, player preferences, and server preferences. Based on the player tracking information, player preferences, and server preferences in a player's account, a central server system may adapt or configure the selectable games, the wagering games, the gaming devices, etc., based on the player.

The player tracking information may include such game play data as an identification of last ten machines played, titles of the games played, and jackpots and other prizes won by the player. For each denomination (e.g., nickel, dime, quarter, half-dollar, dollar, etc.), the game play data may include data fields for the number of credits played, the number of credits paid out, the number of games played, and the time of play in minutes. Of course, the amount and types of data stored in a player's account may be varied to suit a particular casino.

Server preferences can reflect certain parameters that the central server system can adjust according to certain criteria, such as skill level, wagering behavior, and/or operator preferences, to maintain the interest of its players, optimize profitability, etc. The server preferences may include hold percentage, complimentary award rate, complimentary award limits, game eligibility (lockout), and other information. Hold percentage indicates a range of hold percentages, such as high, medium, and low.

A progressive jackpot database 140D may, for example, track how many progressive jackpots are operating, where the progressive jackpots are operating, how much money is in each operating progressive jackpot, what progressive jackpots were paid out, and when the progressive jackpots were paid out. A slot accounting database 140E can include accounting meters for tracking credits in, credits out, credits played, credits won, games played, etc. for one or more of the wagering games. The accounting database 140E may also identify the gaming machine 12 or computing device 14 used to generate this data. These accounting meters can allow the trend analysis computer 136 to analyze the performance of each wagering game, each gaming location, individual gaming machines, groups of gaming machines, etc. The player marketing information database 140F can track, for example, the identities of players, which wagering games are being played the most/least, where the wagering games are being played, when each wagering game is being played (e.g., days/times), and how often and/or for how long each wagering game is being played. This information can, in turn, be used to assess player habits and behaviors. Fewer or additional databases may be incorporated into the corporate headquarters 130 than those identified above.

In networked game play, gaming machines, such as those exemplified in FIGS. 4A and 4B, have configuration parameters that may be customized or otherwise modified, for example, to meet the respective preferences and/or requirements of a specific gaming establishment, to establish communication protocols between a gaming device and a host computer or central gaming system, to optimize machine performance, etc. When a gaming machine is first installed on the gaming floor, or at times throughout its operational life, both electromechanical and electronic gaming machines may require configuration or reconfiguration to communicate with the host computer system, to modify existing game settings, to enable new classes of games, game features and/or gaming functions, etc. For instance, the gaming machines 112A-D of FIGS. 4A and 4B can be in serial communication with at least one host computer, such as the corporate casino computer 134, through a serial poller in a master-slave communication protocol. Each gaming machine 112A-D, when first installed on the floor, may require configuration in order for the gaming machine to communicate with these host computers. With this arrangement, each serial poller can poll an individual gaming machine for data, and the gaming machine replies with the requested data. The host computer(s) can then gather information relating to a specific gaming function performance and/or feature from the gaming machine.

The gathered information may take on a variety of different types and combinations of data. In accordance with aspects of the present disclosure, the data may include player-performance data related to player wagering behavior. In this regard, the player-performance data may be based on a statistical analysis of player wagering behavior. This data may include one or more of the following:

- average ("expected") wager per play—e.g., the average (mean, median, mode, or combination thereof) of the total wager placed for each play of a wagering game, taken over a statistically significant population of plays across a plurality of gaming machines
- average ("expected") bankroll—e.g., the average (mean, median, mode, or combination thereof) of the total money tendered by a player and expended during a single gaming session (e.g., from when the player sits down at a gaming machine and/or initiates initiate a first play of the wagering game until they complete a final play of the wagering game and/or standup to leave the gaming machine), taken over a statistically significant population of plays across a plurality of gaming machines
- average ("expected") time on device—e.g., the average (mean, median, mode, or combination thereof) of the total time expended and/or the total number of plays completed during a single gaming session (e.g., from when the player sits down at a gaming machine and/or initiates a first play of the wagering game until they complete a final play of the wagering game and/or standup to leave the gaming machine), taken over a statistically significant population of plays across a plurality of gaming machines In statistics and probability theory, the median is described as the numerical value separating the higher half of a sample, population, or probability distribution, from the lower half. The median of a finite list of numbers can be found by arranging all the observations from lowest value to highest value and selecting the middle value. The median helps to eliminate/reduce the effects of outliers that may otherwise skew the average value.

The gathered information may also include machine performance information comprising data regarding the operation of a wagering game machine. Various combinations and types of data may be stored as machine performance data. In accordance with aspects of the present disclosure, machine performance data may include a statistical analysis of a gaming machine's monetary input, monetary output, overall use, and/or other metrics relevant to the performance of a machine or group of machines. It is desirable, in at least some embodiments, that the statistical analysis be conducted over a statistically significant sample period. The machine performance data may include one or more of the following:

- coin in data—the monetary value input into the wagering game machine to purchase game play (e.g., total money taken in by an individual gaming machine during a sample period)
- payout data—coin in value multiplied by the hold percentage, where the hold percentage comprises the percentage of coin in held by the casino (e.g., 100%—payback percentage), or coin in value multiplied by the payback percentage over a sample period
- occupancy data—the percentage of time the wagering game machine is occupied (e.g., percentage of time over a sample period—a day, a week, a month, etc.—that an individual gaming machine is in use)

The data may be associated with time data, such as a period of time during which the data was collected. Those of skill in the art will appreciate that other types of data may be maintained and such data is within the scope of this disclosure.

Other exchanged information may include data related to the various configuration parameters that affect the operation of a wagering game machine or the wagering game(s) presented on the wagering game machine. Examples of such configuration parameters may include one or more of the following:

- line count—e.g., the number of lines of symbols to be displayed by a wagering game machine or the number of displayed reel symbols that indicates an outcome of a play of a wagering game
- available paylines—e.g., the number of paylines in a matrix of symbols that may be wagered on and used to determine a winning combination of symbols; a paylines may be straight, horizontal, vertical, diagonal, or may take an arbitrarily defined path through the displayed reel symbols
- denomination(s)—e.g., the minimum amount of money/credits required for a single wager in a single game play (1 cent, 5 cents, 10 cents, 25 cents, 1 dollar, etc.)
- pay tables—e.g., predefined tables that determine the award ("payout") associated with the occurrence of various combinations of symbols, cards, dice, numbers, etc., during play of a wagering game; in a slot machine, a pay table typically shows, for each combination of symbols and the number of coins bet, how many coins the bettor will win
- max bet—e.g., the maximum wager amount available for gambling during any single play of a wagering game
- min bet—e.g., the minimum wager amount available for gambling during any single play of a wagering game
- themes—e.g., images, audio, and video content portraying a theme for a wagering game/gaming machine
- bonus games—e.g., content, including software, audio, image, and video content, that provides a bonus round when triggered during play of a wagering game
- episodic content—e.g., content associated with episodes of a bonus round or wagering game
- attract content—e.g., content (images, audio, video, etc.) presented when the wagering game machine is idle (i.e., in "attract" mode) to attempt to attract players to the machine.
- progressive game—e.g., identification and associated information regarding which, if any, progressive game(s) the wagering game machine participates in
- play mechanics—e.g., aspects of how the wagering game may be played or presented, such as wager button configuration, payline button configuration, cascading reels, free spins, line combinations and other aspects of a wagering game play The above are examples of configuration parameters that may be maintained by a wagering game machine. Those of skill in the art will appreciate that other types of configuration data may be maintained and such configuration data is within the scope of this disclosure.

As noted above, wagering game machines 112A-D may store and maintain various types of information, including those types discussed in the preceding paragraphs. This data may be periodically sent to a host system or central gaming system (e.g., corporate headquarters 130) for use in generating configuration settings/parameters for the wagering game machines. In some embodiments, the data received from one or more wagering game machines may be stored in one or more databases, such as databases 140A-F. A configuration analysis component, such as casino computers 134 and/or trend analysis computers 136, can analyze the data from the database(s) and apply rules defined in a rule set to determine new configuration parameters to be applied to one or more wagering game machines based on the data and the rule set. By way of non-limiting example, the rule set may be defined such that wagering game machines that perform in the lowest 20% when compared to other wagering game machines are automatically reconfigured. For instance, wagering game machines performing in the bottom 20% are reconfigured with configurations similar wagering game machines performing in the upper 20. Many other types of rules and combinations of rules are possible and within the scope of the inventive subject matter, as will be developed in further detail below.

Rules related to machine performance may vary depending, for example, on the goals of the gaming establishment. If revenue maximization is a goal, then the rules related to determining machine performance may use coin-in as a base or primary measurement of performance. Alternatively, if the casino wants to maximize occupancy in the short term in order to hopefully realize more revenue in the long term, then rules based on occupancy data may be used in determining performance of a wagering game machine. Similarly, rules associated with machine configurations may vary depending on the goals of the casino. If revenue maximization is a goal, for example, configurations designed to generate more revenue may be employed. Likewise, if maximizing occupancy is a goal, then configurations designed to provide maximum occupancy may be employed.

A rule set may be designed to take into account various factors when determining a configuration for one or more wagering game machines. For example, the rules may be defined such that a particular mix of themes, denominations, and/or wagering game types should be maintained, perhaps in order to attempt to maximize occupancy and coin in, and thus maximize revenue. Further, the rules may take into account pairings of particular bonus rounds and particular wagering games, pairings of wagering games or other combinations of bonus rounds, themes, episodes, and wagering games that may result in increased revenue and/or occupancy.

In some embodiments, one or more of the databases 140A-F maintains location data for each of the wagering game machines. This location data may then be used by a configuration analysis component, such as casino computers 134 and/or trend analysis computers 136, to determine the themes, denominations, line counts, paylines, max bet, min bet, hold percentage, and/or wagering game types that should be configured for wagering game machines in particular locations. Using location in determining a desired configuration may be preferable because it may be beneficial to locate certain themes, denominations and/or wagering game machine types in particular locations. For example, it may be desirable to locate games having a similar theme in one location. Further, it may be desirable to locate machines with particular denominations together and/or in a particular location in a casino. Further, it may be desirable to achieve a particular distribution of themes, denominations or wagering game types across a casino floor. As will be developed in further detail below, location data may also include geographic location, such as a city, state, country, or region of a country. It may be desirable to include such location data because wagering patterns may be different in different areas of a country or in different countries of the world.

Rules may also be time based. For example, it may be desirable to create configurations based on a time of day, day of week, time of year, or for special events that occur from time to time. For example, it may be desirable to reconfigure denominations based on time of day, with lower denominations used during the daytime and/or during weekdays, and higher denominations used at night time and/or during weekends. Similarly, certain events may make it desirable to adjust denominations, paylines, pay tables or other configuration parameters. By way of example, and not limitation, if a major boxing match is to occur on particular date, it may be desirable to configure wagering game machines with higher denominations, higher maximum bets, and/or higher line counts on the assumption that players that attend major boxing matches may also be willing to wager larger amounts.

Configuration analysis may also take configuration costs into account in determining a configuration or recommended configuration. Some configuration changes may be made at little or no cost to a gaming establishment, while other configuration changes may come with a relatively high cost. For example, configuration changes to paylines, max/min wager amounts, or average payout (i.e., payback percentage) may be made at relatively little cost, while a configuration change that requires a new game, new bonus round, or new episodic content may cost significant amounts of money to make (e.g. game cost, licensing fees etc.). Thus, the configuration analysis component of some embodiments may measure the cost of a configuration change when determining what, if any, configuration changes may be used to improve the performance of one or more wagering game machines.

Configuration analysis may run in a number of different ways. In some embodiments, a configuration analysis component may run continuously or automatically at particular times to reanalyze and generate new configurations based on current performance data. The new configurations may then be automatically sent to one or more wagering game machines. Alternatively, the configuration analysis component may generate an alert message that may be sent to a casino operator alerting the operator that a new configuration has been generated. The operator may then review the configuration and confirm or modify the configuration before the configuration is sent to the wagering game machine(s).

Optionally, configuration analysis may be run in response to an operator or technician initiating a configuration analysis component. Upon initiation, the configuration analysis component may analyze the available data and generate new recommended configurations for one or more wagering game machines. The configuration analysis component may then automatically initiate the new configuration, or may display a suggested configuration and allow for modification and/or confirmation via a user interface before automatically sending the configuration to one or more wagering game machines.

A rule set may be implemented as a set of heuristics that are encoded as instructions in a configuration analysis component. Heuristics refers to experience-based techniques for problem solving, learning, and discovery. Where an exhaustive search is impractical, heuristic methods are used to speed up the process of finding a satisfactory solution (e.g., the best approximate result). In some embodiments, the rule set may be defined in a rules definition language that may be input or edited, e.g., via a user interface. In further embodiments, rules sets may include rules that are discovered or defined with the assistance of a relationship discovery process. Examples of such processes can include neural networks, cluster analysis, statistical analysis, artificial intelligence methods, or other analysis methods designed to discover relationships in data. Further details on such analysis methodologies and systems may be found in U.S. Patent Application Publication No. 2004/0166940 A1, to Wayne H. Rothschild, which is incorporated herein by reference in its entirety and for all purposes.

The user interface may be presented to a configuration workstation, which may be communicatively coupled, for example, via a network to a central system. This workstation may be based in the gaming establishment, or it may be offsite at a central operating system or at a third party responsible for administering configurations for the casino. For example, the performance data may be generated at one or more casinos and sent to a third party for storage and analysis. The third party may then provide a recommended configuration for one or more wagering game machines. The user interface may invoke the configuration analysis component in order to have new configurations automatically generated. The user interface may provide interface elements such as drop down menus, prompts, popup menus, instructions, icons, and buttons to allow a user to confirm, modify, or otherwise manipulate the generated configuration.

It may be desirable, in at least some embodiments, for the user interface to provide a selection mechanism allowing a user to select a template or default configuration from a set of templates/defaults. These templates may provide predefined configurations or configuration rules that may be useful for certain situations, such as when a casino is being set up for the first time and no performance data is available. Templates may be selected based on the anticipated characteristics of the casino or casino customer base. For example, one template may be used if the customer base tends to wager high amounts while a different template may be used if the customer base tends to wager low amounts. Similarly, templates may exist for high occupancy situations and other templates for low occupancy situations.

The user interface may present a "wizard" style interface that leads the operator through a series of questions designed to determine the characteristics of the casino and/or casino customer base. After the questions have been answered, the configuration analysis component may select a template or rule set that best matches the characteristics based on the answers provided by the user.

For some embodiments, the user interface may allow a user to manually generate or modify a configuration parameter for one or more wagering game machines. As the user is entering a configuration parameter, the entered value may be analyzed and, if determined to not be compliant with predefined rule sets or contradictory to determinations made from available data, suggest an alternative setting for the configuration parameter. For example, a user may configure an electronic video slot machine with a 15-payline configuration. However, configuration analysis may determine that a 20-payline configuration may be more likely to provide increased revenue. The user interface may then present a pop-up window or other user interface element that provides a suggestion to use the alternative parameter.

Figure 5:
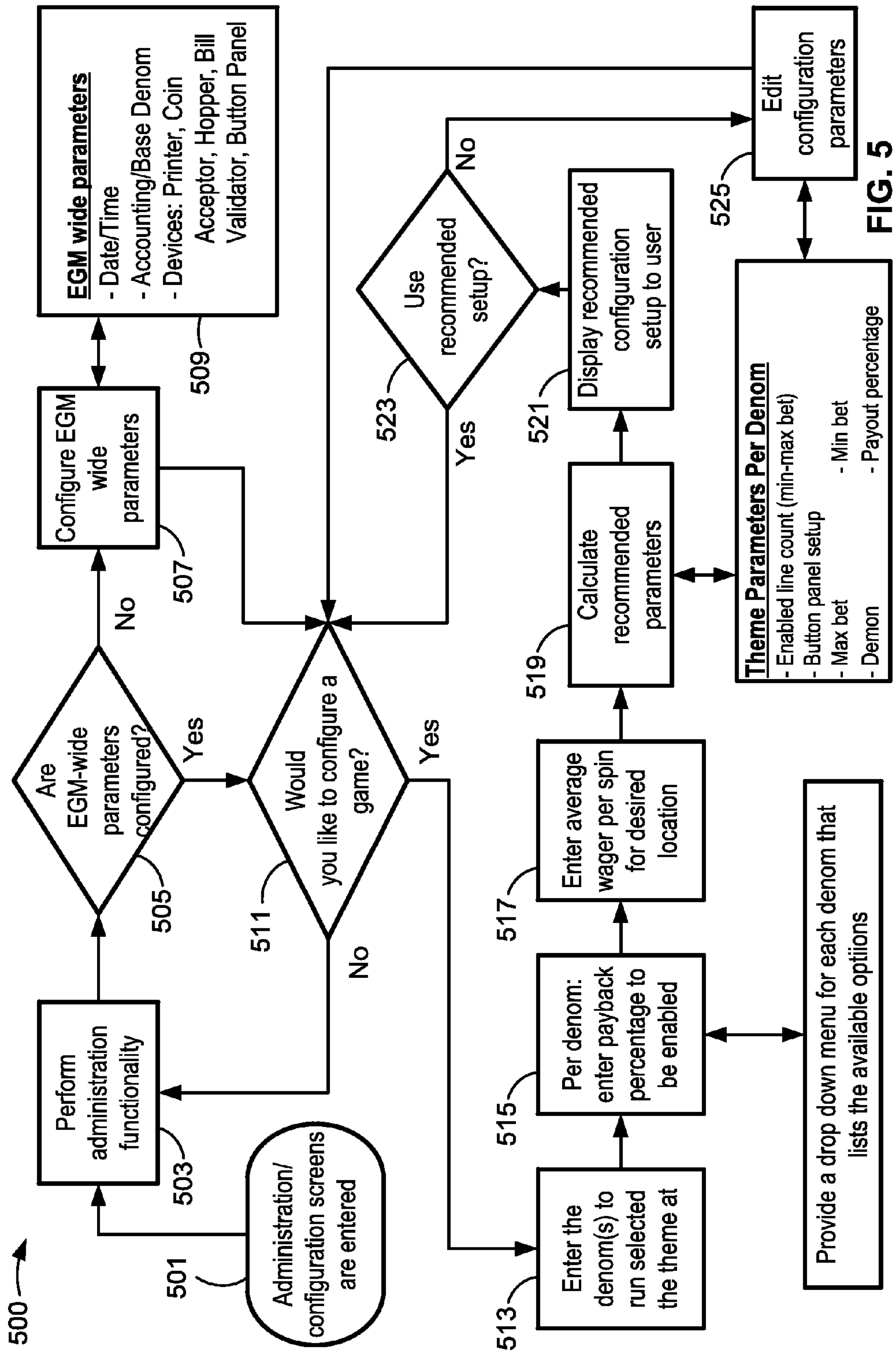
FIG. 5 is a flowchart for an exemplary method or algorithm that can correspond to instructions that can be stored on one or more non-transitory computer-readable media and can be executed by one or more controllers in accord with aspects of the disclosed concepts.

With reference now to the flow chart of FIG. 5, an improved method for configuring one or more gaming devices in a gaming system, such as the gaming devices and systems shown in FIGS. 1, 2, 4A and 4B, for example, is generally described at 500 in accordance with aspects of the present disclosure. FIG. 5 can be representative of an algorithm that corresponds to at least some instructions that can be stored, for example, in main memory 32 of FIG. 2, and executed, for example, by the CPU 30 and/or external system(s) 48 of FIG. 2 to perform any or all of the above or below described functions associated with the disclosed concepts. The method 500 will be described with reference to the various aspects and features shown in the drawings; such reference is being provided purely by way of explanation and clarification.

In some embodiments, the method 500 provides a learned recommendation for configuring a wagering game machine or a group of gaming machines. The method 500 may act as a vehicle to disseminate knowledge and to tailor one or more gaming machines to a targeted player demographic. This is achieved, in at least some of the disclosed concepts, by learning the optimal configuration parameter(s) and, based upon one or more inputs received from the operator, suggesting changes that should be made to improve machine performance. By collecting values for a set of variables, and then applying a set of heuristics to these values, the method can find the best EGM configuration setup to fit those parameters.

At block 501, the configuration process begins. For example, when the EGM is first brought into service (i.e., turned on for the first time on the gaming floor), the operator can be automatically prompted to configure the EGM and the wagering game(s) available on that particular EGM. Once the EGM and game(s) are properly configured, the EGM is made available to the public for play. As indicated above, the configuration process may be conducted when the gaming machine is first installed on the gaming floor, as just discussed, and/or at various times throughout its operational life.

When the EGM boots up, the administrator enters a configuration screen. During the initial setup, the administrator may be required to perform some basic administration functions, as indicated at block 503. These administrative functions may include, as some non-limiting examples, entering general client information (e.g., name, address, etc.), selecting the sound level, selecting the display brightness, setting emotive lighting, etc.

During the configuration process, the operator may need to set "EGM-wide parameters." In this regard, the method 500 may include, at block 505, determining if the EGM-wide parameters are configured. If a determination is made that the EGM-wide parameters are not configured (Block 505=No), the method 500 proceeds to block 507 to configure the EGM-wide parameters. For implementations where the administrator assists in configuring these parameters, a series of menu screens with user-selectable buttons may be displayed via the EGM such that the operator can set these parameters. The EGM-wide parameters may include date and time configuration, accounting and base denomination configuration, peripheral device configuration, etc., as listed in the data section 509 in FIG. 5. For example, an EGM may support running with different bill validators from different hardware manufactures. The operator may therefore be required to select from a predefined list the bill validator that is installed into the EGM hardware.

If the EGM-wide parameters were already configured (Block 505=Yes), or after the EGM-wide parameters are configured, e.g., via the administrator at Block 507, the method 500 proceeds to block 511 to determine if one or more of the wagering games available on the EGM should be or need to be configured. In order to configure a game, and thus make it available for play on the EGM, the operator may first be required to select a game, e.g., in instances where there are numerous games available on the EGM. In some embodiments, multiple games can be selected and configured from a single EGM, e.g., in a multigame setup. One or more of the recommended values for the configuration parameters of the EGM may be based on the selected wagering game(s).

The configuration process for setting up a wagering game may include the operator selecting different game parameters (e.g., entering desired values for various game-configuration variables), such as denomination, payout percentage, line count, max bet, min bet, and which buttons on the EGM button panel activates which wagers. These selected parameters affect the "pricing" of the game and the math experience offered to the player when playing the wagering game. Put another way, the game-configuration variable typically affects the payback percentage of the wagering game—e.g., how much it will cost the player to play the game. These parameters will oftentimes affect the performance of the EGM, including how much money the EGM will bring in, how much money it will payout, the average time on device, and the average expenditure per player per gaming session (i.e., "bankroll). In the illustrated example, the system relies on the administrator of the EGM to set some of these configuration parameters.

With continuing reference to FIG. 5, block 513 includes selecting which denomination or denominations will be made available to players for play of the selected wagering game. For example, the administrator may be prompted at block 513 to "Please enter the denom(s) you would like to make available for this theme." The operator may then select from a predefined menu the denomination(s) they want the game to execute at (e.g., 1 cent, 5 cents, 10 cents, 25 cents, 1 dollar, etc.), or they may be allowed to enter them manually, for example, via a touch screen QWERTY keyboard. At block 515, the method 500 includes determining the payback percentage for each selected denomination. In this regard, the administrator may be prompted to "Per Denom: Please enter the payback percentage you would like enabled." Alternatively, one or more of the available denominations will have a predefined payback percentage associated therewith (e.g., block 515 may be omitted). The available options usually range between 86%-92%. For example, if an operator selects a 92% payback percentage, the EGM, on average, will pay out 92 cents of every dollar that is wagered. Statistics show that the game will converge towards this targeted percentage over time as more wagers are placed.

The method 500 may then include determining a desired value for a player-performance variable. According to some of the disclosed concepts, any recommended value output for the configuration parameter(s) is based on a respective desired value received for each of a plurality of player-performance variables. The desired value for each player-performance variable may be based, at least in part, on a statistical analysis of player wagering behavior. Physical interaction with a technician or operator, however, is not required for the desired value(s) to be determined. A desired value can be determined via one or more of the gaming devices on the gaming floor, via a central gaming system networked with the gaming device(s), via an operator, via a third party provider, or any combination thereof.

It is desirable, in some of the disclosed embodiments, for the player-performance variable to comprise an average wager per play of the wagering game or, in a more specific instance, the mathematical median bet per spin of a slot game. Block 517 of FIG. 5, for example, includes entering a desired value for the average wager per spin for the desired location of the EGM. In this regard, the administrator may be prompted to "Please enter the average wager per spin where the game is located." Generally speaking, the operator is asked for information about the type of wagering behavior that is occurring in a particular gaming establishment, or in a specific section of the gaming establishment, where the EGM is placed. Alternatively, software in the EGM can decipher this value based on information collected by queries to other EGM's located within that vicinity. Optionally, a central accounting system may track this information and make it available to the EGM.

Based on the desired value or values, a recommended value is generated for one or more configuration parameters of the EGM. For some embodiments, a recommended value is output for a variety of configuration parameters based on the desired value or values that are entered. Recommended values may be based on desired values for both player-performance variables (e.g., average wager per play and average number of payline played) and game-configuration variables (denom and payback percentage). In this regard, the method 500 includes, at block 519, calculating the recommended parameters. The suggested configuration parameter(s) typically affect the mathematical configuration of the wagering game. By way of non-limiting example, the configuration parameters may include the wagering game line count, available payline count, maximum available bet, and/or minimum available bet. The suggested configuration parameters could also include a recommended hold percentage or payback percentage, recommended reset values related to one or more progressive jackpots, and/or how much a player has to wager in order to cover all available paylines. Other configuration parameters may include what options the player is provided while playing the wagering game, such as whether the game will be multi-denominational and, if so, which denominations are made available (penny, nickel, quarter, dollar, etc.). It may also be recommended that a progressive game feature be turned on/off.

The suggested configuration parameters may also be directed to the wagering configuration of the button panel of the EGM. In particular, every EGM includes display features for providing information and options to a player. Among these available display features may be a row of player-selectable payline buttons, each of which gives a player the option of quickly selecting and activating a predetermined number of paylines. For instance, the row of player-selectable payline buttons may include the following five options:

(1 payline) (5 paylines) (9 paylines) (20 paylines) (40 paylines)

Another option would be to provide a row of player-selectable wager buttons, each of which gives a player the option of quickly selecting a predetermined bet per activate payline. For instance, the row of player-selectable wager buttons may include the following five options:

(1 credit) (2 credits) (3 credits) (5 credits) (10 credits)

For these EGM's, the suggested configuration parameters may include the predetermined number of paylines and/or the predetermined bet per payline for each player-selectable button. With regard to the latter, the suggested configuration may include determining a wager range available to the player during play of a wagering game, wherein the available wagering range is configured to prevent the player from wagering at the highest or lowest available wager values. This may include setting the highest (e.g., rightmost) and lowest (e.g., leftmost) player-selectable wager buttons to values that are expected to bias the player towards using the second-to-lowest player-selectable wager button (or "second button"). Moreover, the value of the second button may be set to be approximately equal to the average wager per play of the wagering game with all lines covered.

Various means may be used to determine the EGM configuration parameters. A software algorithm may be used to calculate, from the desired value(s), the proper EGM configuration parameters. Alternatively, a lookup table may be used such that the input is mapped to a corresponding predefined set of configuration parameters. Optionally, a database of information may be generated for each customer (remotely or on-site), and the suggested configuration parameters may be tailored to that customer based on the corresponding database of customer information. It would also be possible to have a “smart software algorithm” that would translate the input into the correct game configuration parameters. This evaluation of the heuristics and corresponding rules can be done on an EGM or an external device or a cloud service. In some embodiments, the determination is game (“theme”) specific, meaning that different games will have different configuration parameters based on the input(s). Optionally, a website could be provided which allows the operator to enter values for the player-performance and/or game-configuration variables, the EGM configuration parameters are determined by a back-end third-party provider, and the EGM is configured remotely or a code directory is provided to the operator that is entered to set up the EGM.

Once the recommended configuration parameters are determined, they can be output to the operator. Block 521, for example, includes displaying the recommended setup to the user. This may include providing, via the primary display device of the EGM, operator-selectable options to confirm, reject, and/or modify the recommended values. Block 523 then requests confirmation to configure the EGM in accordance with the recommended configuration parameter/parameters. Once confirmation is received, the method 500 will responsively configure the EGM in accordance with at least the recommended values for the configuration parameters. Some optional embodiments may include automatically configuring the EGM without first displaying the suggested configuration parameters and/or requesting confirmation (e.g., omitting blocks 521 and/or 523). Moreover, the operator may input a rejection of one or more of the recommended values for the configuration parameters. In addition, or as an alternative, the operator may input a desired modification to a recommended value for the configuration parameter, as indicated at block 525. Optionally, the method can also inform the operator how any modifications to these suggested configuration values will affect the EGM (e.g., a feedback loop). In general, once the configuration parameters have been determined based on the input(s), the operator can be given the option to accept the recommended setup or reject it, and may then be given the option to change or customize the recommended setup via an advanced selection. Once the configuration process is complete, the method 500 may return to block 511 to allow the operator to configure another wagering game, for example, in a multigame situation. With the foregoing features, the operator can quickly and easily modify the product mix on the floor, i.e., the available wagering game options, and how to configure each individual product.

As indicated above, it may be desirable in some embodiments to configure a wagering game machine in a way that incentivizes a particular player demographic, such as players at a particular location within a particular casino, to play on that machine. For example, one casino may have a room where the average bet on the EGM’s in that room is approximately 50-60 cents; we would then configure the gaming machines to ensure that the minimum and maximum wager options are configured to coincide with and exploit that average. Conversely, in another location within that same casino (or another casino altogether) the average bet on the EGM’s is approximately $1.05; those gaming machines would be configured to ensure that the minimum and maximum bet options coincide with that average. This will help to ensure that players will not only be drawn to those machines, but when actually playing on those machines, their average bet is at least on par with the average bet for that location.

Suggested values for EGM configuration parameters may also be based on the location of the gaming establishment itself. If the gaming establishment is located in the Midwest of the United States, for example, you may want to configure the EGM’s with lower bet options since the Midwest typically has a relatively low average wager per play. In contrast, if the gaming establishment is located in the Northeast or on the West Coast of the United States, you may want to configure the EGM’s with higher bet options since those regions are known to typically have a higher relative average wager per play. Similar rules may be applied on a more granular scale (bank v. bank, room v. room, etc.) a more localized scale (casino vs. casino, neighborhood vs. neighborhood, city vs. city, etc.) or even on an international scale (e.g., U.S. vs. Australia vs. France, etc.)

According to some aspects of the disclosed concepts, the ability to cover all lines is a minimum requirement for a wagering game. In particular, the minimum average bet per play should be sufficient to cover all lines during a play of the corresponding wagering game. If the player cannot cover all lines in this manner, a suggestion is made to change the configuration parameters to ensure compliance with this requirement. If the average wager per play on the casino floor for a particular game theme does not allow a player to cover all lines, a different denomination may be suggested. If the wagering game is already operating at the lowest available denomination for that theme, a different theme with a lower available denomination may be suggested. As another option to achieve this desired average bet, it may be suggested that the wagering game be reconfigured with a lower line count to make sure that the player can cover all lines.

When determining suggested values for the EGM configuration parameters, a monitoring scheme or system may be employed to check the surrounding gaming machines to determine if that section of the floor, or the entire floor for that matter, is misconfigured and providing flawed information. By way of example, if player wagering-behavior analysis is showing that players in a particular section are, on average, betting with the second-to-highest player-selectable wager button (or the “fourth button” in a five button arrangement), the EGM is misconfigured. The available wager range for that particular section is configured too low, which may have resulted from the average wager per play for that section of the floor being calculated to be too low. In this instance, it should be suggested to raise the upper end of the range or possibly shift the whole range upwards.

Certain queries may be prioritized in determining the suggested configuration parameters. In this regard, a hierarchy of questions can be generated, ranging from most important to least important, from simplest to most complex, or a combination thereof. In accordance with at least some of the disclosed concepts, a single “principal” or “fundamental” question can be employed to generate recommended values for a number of configuration parameters. For a simple hierarchy, after one question is asked and answered, and a set of values are recommend, the operator may be given the option to answer the next question in the hierarchy to get a different set of recommend values that are more closely tailored to that operator’s needs. In some embodiments, the primary question is what is the average wager per play in this location. Second tier questions may include what is the denomination the operator wishes the EGM to operate at (e.g., minimum denomination) and/or what is the desired payback percentage. Third tier questions may include: how often is this location at capacity, when is this location at capacity, and/or what is the average bet when this location is at capacity. Fourth tier questions may include: what is the average bankroll for this location, what is the average time on device for this location, and/or what is the average number of plays per monetary input. Operators may also be asked if they wish to fix all lines—many slot games allow the player to choose how many lines they're playing; however, the operator may sometimes override that feature and insist that the player play all the lines. Specific questions may be generated that are designed to take advantage of the knowledge of the technicians who are installing the EGM on the floor, while a set of questions may be generated that are designed to take advantage of what the casino is likely to know but not freely share. The questions may also vary based on game theme, casino, participation, location, etc. Moreover, the questions do not have to be a fixed set of absolute questions—the questions can be adaptive.

Also disclosed is an optional unified interface configuration module between the administration, operation and maintenance (AOM) server(s), Mirador server(s), real-time gaming (RTG) server(s), and the EGM. An abstracted cross-platform "EGM configuration application" can be built and called up by different systems during configuration. Any system could then set the configuration parameters and transmit them to a standard application programming interface (API). An advantage of this system is that updates, improvements, and/or changes can more easily propagate from one system to another, rather than having separate configuration implementations for each system. This approach can also offer more cross-system consistency.

At the end of the configuration process, a verification process may be initiated to verify that the gaming machine has been configured correctly. One method for doing this is to monitor the EGM to ensure that the CPU correctly responds to each of the configuration signals. This may include, for example, validating that the reconfiguration results in a positive change (e.g., improved machine performance and increased yield). The validation process may require a threshold validation period, such as a minimum amount of time or a minimum number of plays, to offset periods of infrequent use. In many jurisdictions only certain configuration parameters might be acceptable. In many jurisdictions only certain configuration parameters might be acceptable. Consequently, the gaming machine may be designed to verify that the configuration parameters requested are allowable in the jurisdiction where that machine is located. If they are not allowable, the configuration may be rejected without changing the gaming machine configuration parameters. A verification ticket may be printed that will indicate that the configuration has not been accepted and the configuration parameters have not been changed.

The above teaching show that player behavior, customer preferences, heuristics, and rules can be used to specify how various combinations of themes, denominations, pay tables, line counts, coins per line, max wager amounts, hold percentages, episodes, or other configuration parameters, as well as other factors, can be used in configuring one or more wagering game machines. A new configuration may result in dramatic changes, such as new wagering games, bonus rounds, or episodes being configured for a wagering game machine. Alternatively a new configuration may result in relatively minor changes such as adjusting the hold percentage based on occupancy and average wager on a wagering game machine. The analysis may be based on absolute performance, for example, reconfiguring machines in the bottom 20th percentile, or it may be based on performance trends, e.g. machines in which revenue has been declining for a period of time. Additional information regarding the configuration of wagering game machines can be found, for example, in commonly owned U.S. Pat. No. 8,142,291 B2, to Chad A. Ryan, commonly owned U.S. Pat. No. 7,641,555 B2, to Edward A. McKinley et al., commonly owned U.S. Pat. No. 6,749,510 B2, to John J. Giobbi, and commonly owned U.S. patent application Ser. No. 12/438,239 (corresponding to U.S. Patent Application Publication No. 2010/0234097 A1), to Phil Gelber et al., all of which are incorporated herein by reference in their respective entireties and for all purposes.

In some embodiments, the method 500 includes at least those steps enumerated above. It is also within the scope and spirit of the present invention to omit steps, include additional steps, and/or modify the order presented above. It should be further noted that the method 500 represents a single play of a wagering game. However, it is expected that the method 500 be applied in a systematic and repetitive manner.

Aspects of this disclosure can be implemented, in some embodiments, through a computer-executable program of instructions, such as program modules, generally referred to as software applications or application programs executed by a computer. The software can include, in non-limiting examples, routines, programs, objects, components, and data structures that perform particular tasks or implement particular abstract data types. The software can form an interface to allow a computer to react according to a source of input. The software can also cooperate with other code segments to initiate a variety of tasks in response to data received in conjunction with the source of the received data. The software can be stored on any of a variety of memory media, such as CD-ROM, magnetic disk, bubble memory, and semiconductor memory (e.g., various types of RAM or ROM).

Moreover, aspects of the present disclosure can be practiced with a variety of computer-system and computer-network configurations, including hand-held devices, multiprocessor systems, microprocessor-based or programmable-consumer electronics, minicomputers, mainframe computers, and the like. In addition, aspects of the present disclosure can be practiced in distributed-computing environments where tasks are performed by remote-processing devices that are linked through a communications network. In a distributed-computing environment, program modules can be located in both local and remote computer-storage media including memory storage devices. Aspects of the present disclosure can therefore, be implemented in connection with various hardware, software or a combination thereof, in a computer system or other processing system.

Any of the methods described herein can include machine readable instructions for execution by: (a) a processor, (b) a controller, and/or (c) any other suitable processing device. Any algorithm, software, or method disclosed herein can be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it can be implemented by an application specific integrated circuit (ASIC), a programmable logic device (PLD), a field programmable logic device (FPLD), discrete logic, etc.). Also, some or all of the machine readable instructions represented in any flowchart depicted herein can be implemented manually. Further, although specific algorithms are described with reference to flowcharts depicted herein, persons of ordinary skill in the art will readily appreciate that many other methods of implementing the example machine readable instructions can alternatively be used. For example, the order of execution of the blocks can be changed, and/or some of the blocks described can be changed, eliminated, or combined.

It should be noted that the algorithms illustrated and discussed herein as having various modules or blocks or steps that perform particular functions and interact with one another are provided purely for the sake of illustration and explanation. It should be understood that these modules are merely segregated based on their function for the sake of description and represent computer hardware and/or executable software code which can be stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While many representative embodiments and exemplary modes for carrying out the present invention have been described in detail above, those familiar with the art to which this invention relates will recognize various alternative designs and embodiments for practicing the invention within the scope of the appended claims.

What is claimed is:

1. A gaming system for playing a wagering game, the gaming system comprising:

one or more processors;

a non-optimal gaming device;

a plurality of other gaming devices; and one or more memory devices storing instructions that, when executed by at least one of the one or more processors, cause the gaming system to:

receive, via an input device, a desired value for a performance target for the non-optimal gaming device derived from aggregated data gathered from the plurality of other gaming devices;

in response to receiving the desired value, determine, by an automated configuration analysis component, a plurality of recommended configuration parameters for the non-optimal gaming device based on the desired value, wherein the performance target is not one of the recommended configuration parameters;

in response to receiving a confirmation input via at least one of one or more input devices, configure the non-optimal gaming device with a device configuration determined in accordance with the plurality of recommended configuration parameters;

detect, via a value input device of the non-optimal gaming device, a physical item associated with a monetary value that establishes a credit balance; and in response to an input indicative of a wager covered by the credit balance, initiate the wagering game on the non-optimal gaming device configured with the device configuration, display an outcome for the wagering game at the non-optimal gaming device, and adjust the credit balance in accordance with the outcome.

2. The gaming system of claim 1, wherein the device configuration changes a mathematical configuration of the wagering game.

3. The gaming system of claim 1, wherein the automated configuration analysis component uses additional information specific to the non-optimal device to determine the plurality of recommended configuration parameters.

4. The gaming system of claim 1, wherein the desired value is based, at least in part, on a statistical analysis of player wagering behavior of a population of plays across the plurality of other gaming devices.

5. The gaming system of claim 4, wherein the desired value is an average wager per play of one or more wagering games over a sample period of time across the plurality of other gaming devices.

6. The gaming system of claim 1, wherein the stored instructions further cause the gaming system, in response to receiving a rejection input including a modification to the plurality of recommended configuration parameters, configure the non-optimal gaming device with the device configuration determined in accordance with a modified plurality of configuration parameters.

7. The gaming system of claim 1, wherein the confirmation input is input by an authorized operator.

8. The gaming system of claim 1, wherein the stored instructions further cause the gaming system to receive, via at least one of the one or more input devices, a selection of one of a plurality of available wagering games for the non-optimal gaming device, wherein one or more of the recommended configuration parameters are further based on the selected one of the wagering games.

9. The gaming system of claim 1, wherein the stored instructions further cause the gaming system to poll the plurality of other gaming devices to gather the aggregated data.

10. The gaming system of claim 1, wherein the plurality of recommended configuration parameters includes at least one of a line count, an available payline count, a maximum available bet, a minimum available bet, and a button panel wagering configuration.

11. The gaming system of claim 1, wherein the aggregated data includes player-performance data based on a statistical analysis of player wagering behavior across the plurality of other gaming devices.

12. The gaming system of claim 1, wherein the aggregated data includes machine-performance data based on a statistical analysis of one or more metrics relevant to the performance of the plurality of other gaming devices.

13. The gaming system of claim 1, wherein the desired value is determined by one or more processors of the plurality of other gaming devices, by one or more processors of a central gaming system networked with the plurality of other gaming devices, by an operator, or a by combination thereof.

14. The gaming system of claim 1, wherein the one or more processors, the one or more input devices, and the one or more memory devices, individually or in any combination, are resident in the non-optimal gaming device.

15. A computer-implemented method of configuring a non-optimal gaming device in a gaming system, the gaming system having one or more processors and a plurality of other gaming devices, the method comprising:

receiving, via an input device, a desired value for a performance target for the non-optimal gaming device derived from aggregated data gathered from the plurality of other gaming devices;

in response to receiving the desired value, determining, by at least one of the one or more processors initiating an automated configuration analysis component, a plurality of recommended configuration parameters for the non-optimal gaming device based on the desired value, wherein the performance target is not one of the recommended configuration parameters;

in response to receiving a confirmation input via at least one of one or more input devices, at least one of the one or more processors configuring the non-optimal gaming device with a device configuration determined in accordance with the plurality of recommended configuration parameters;

detecting, via a value input device of the non-optimal gaming device, a physical item associated with a monetary value that establishes a credit balance; and in response to an input indicative of a wager covered by the credit balance, at least one of the one or more processors initiating the wagering game on the non-optimal device configured with the device configuration, displaying an outcome for the wagering game at the non-optimal gaming device, and adjusting the credit balance in accordance with the outcome.

16. The method of claim 15, wherein the device configuration changes a mathematical configuration of the wagering game, and the desired value is based, at least in part, on a statistical analysis of player wagering behavior across the plurality of other gaming devices.

17. The method of claim 15, wherein the desired value is an average wager per play of one or more wagering games over a sample period of time across the plurality of other gaming devices.

18. The method of claim 15, further comprising in response to receiving a rejection input including a modification to the plurality of recommended configuration parameters via at least one of the one or more input devices, at least one of the one or more processors configuring the non-optimal gaming device with the device configuration determined in accordance with a modified plurality of configuration parameters.

19. The method of claim 15, further comprising receiving the confirmation input by an authorized operator.

20. The method of claim 15, further comprising receiving, via at least one of one or more input devices, a selection of one of a plurality of available wagering games for the non-optimal gaming device, wherein one or more of the recommended configuration parameters are further based on the selected one of the wagering games.

21. The method of claim 15, further comprising at least one of the one or more processors polling the plurality of other gaming devices to gather the aggregated data.

22. The method of claim 15, wherein the aggregated data includes player-performance data based on a statistical analysis of player wagering behavior across the plurality of other gaming devices or machine-performance data based on a statistical analysis of one or more metrics relevant to the performance of the plurality of other gaming devices.

23. A gaming terminal for conducting a wagering game, the gaming terminal comprising:

at least one display device configured to display randomly determined outcomes of the wagering game;

at least one input device configured to receive inputs from a person;

at least one processor; and at least one memory device storing instructions that, when executed by the at least processor, causes the gaming terminal to:

receive from an operator, via the at least one input device, a respective desired value for each of a first performance target and a second performance target for the gaming terminal, wherein the desired value of the first performance target defines player-performance data derived from a statistical analysis of player wagering behavior across a plurality of other gaming devices and the desired value of the second performance target defines game-configuration data specifying a payback percentage of the wagering game;

initiate, via the at least one processor, an automated configuration analysis component to determine and display a respective recommended value for each of a plurality of recommended configuration parameters of the gaming terminal based on the desired values, wherein the first and second performance target are not one of the recommended configuration parameters;

display, via the at least one display device, operator-selectable options to confirm, reject, or modify the recommended values for the plurality of recommended configuration parameters;

in response to receiving a confirmation input, configure the gaming terminal, via the at least one processor, with a device configuration determined in accordance with at least the recommended values for the plurality of recommended configuration parameters;

detect, via a value input device of the gaming terminal, a physical item associated with a monetary value that establishes a credit balance; and in response to an input from a player indicative of a wager covered by the credit balance, via the at least one processor, initiate the wagering game on the gaming terminal configured with the device configuration, display an outcome for the wagering game at the gaming terminal, and adjust the credit balance in accordance with the outcome.

24. A computer-implemented method of configuring a non-optimal gaming device of a wagering game system that includes one or more processors and one or more input devices, the method comprising:

receiving, via at least one of the one or more input devices, a desired value for an average wager per play for the non-optimal gaming device, the desired value derived from aggregated data gathered from a plurality of other gaming devices;

in response to receiving the desired value, determine, by an automated configuration component a recommended value for each of a plurality of recommended configuration parameters for the non-optimal gaming device based at least upon the desired value, wherein the average wager per play is not one of the recommended configuration parameters;

configure the non-optimal gaming device, via the one or more processors, with a device configuration determined in accordance with at least the recommended value for each of the plurality of recommended configuration parameters;

detect, via a value input device of the non-optimal gaming device, a physical item associated with a monetary value that establishes a credit balance; and in response to an input indicative of a wager covered by the credit balance, via one or more processors, initiate the wagering game on the non-optimal device configured with the device configuration, display an outcome for the wagering game at the non-optimal gaming device, and adjust the credit balance in accordance with the outcome.

25. A computer-implemented method of configuring a non-optimal gaming device of a wagering game system that includes one or more processors and one or more input devices, the method comprising:

receiving, via at least one of the one or more input devices, a desired value for an average wager per play for the non-optimal gaming device derived from aggregated data gathered from a plurality of other gaming devices;

in response to receiving the desired value, determine, by an automated configuration analysis component a recommended wager range available to a player during play of a wagering game on the non-optimal gaming device based at least upon the desired value, the available wagering range being determined to prevent the player from wagering at the highest or lowest value of the wagering game as currently configured;

configure the non-optimal gaming device, via at least one of the one or more processors, in accordance with the available wager range;

detect, via a value input device of the non-optimal gaming device, a physical item associated with a monetary value that establishes a credit balance; and in response to an input indicative of a wager covered by the credit balance, via one or more processors, initiate the wagering game on the non-optimal gaming device configured with the available wager range, display an outcome for the wagering game at the target gaming device, and adjust the credit balance in accordance with the outcome.

* * * * *